United States Patent
Wu et al.

(10) Patent No.: US 6,999,144 B2
(45) Date of Patent: Feb. 14, 2006

(54) TRANSFLECTIVE LIQUID CRYSTAL DISPLAY DEVICE HAVING PARTICULAR ANGLES BETWEEN OPTICAL AXES

(75) Inventors: Yang-En Wu, Taipei (TW); Po-Lun Chen, Chiayi (TW)

(73) Assignee: AU Optronics Corporation, Hsinchu (TW)

(*) Notice: Subject to any disclaimer, the term of this patent is extended or adjusted under 35 U.S.C. 154(b) by 61 days.

(21) Appl. No.: 10/798,942

(22) Filed: Mar. 11, 2004

(65) Prior Publication Data
US 2004/0233358 A1 Nov. 25, 2004

(30) Foreign Application Priority Data
May 23, 2003 (TW) ............................... 92113955 A

(51) Int. Cl.
*G02F 1/1335* (2006.01)
*G02F 1/13363* (2006.01)
(52) U.S. Cl. ........................ 349/114; 349/121; 349/119; 349/180; 349/181
(58) Field of Classification Search ................ 349/117, 349/119, 143, 147, 96, 138, 144
See application file for complete search history.

(56) References Cited

U.S. PATENT DOCUMENTS 6,295,109 B1 * 9/2001 Kubo et al. .................. 349/119
6,801,283 B1 * 10/2004 Koyama et al. ............. 349/119

* cited by examiner

*Primary Examiner*—Andrew Schechter
*Assistant Examiner*—Lucy Chien
(74) *Attorney, Agent, or Firm*—Thomas, Kayden, Horstemeyer & Risle

(57) ABSTRACT

A transflective liquid crystal device capable of balancing a color difference between a reflective region and a transmissive region. The arrangement conditions of optical elements in the transflective LCD are as follows. The twist angle of the liquid crystal is about 40°~80°. The angles $\beta_{up}$, $\beta_{down}$, $\theta_{up}$ and $\theta_{down}$ are about −20°~−60°, −20°~20°, 60°~110°, −30°~20° respectively. The angle between the retardation axes of the upper λ/2 plate and the upper λ/4 plate is about 30°~100°, and the angle between the retardation axes of the lower λ/2 plate and the lower λ/4 plate is about 30°~80°.

3 Claims, 4 Drawing Sheets

US 6,999,144 B2

TRANSFLECTIVE LIQUID CRYSTAL DISPLAY DEVICE HAVING PARTICULAR ANGLES BETWEEN OPTICAL AXES

BACKGROUND OF THE INVENTION

1. Field of the Invention

This invention relates in general to a transflective liquid crystal display (LCD). More particularly, this invention relates to a transflective liquid crystal display (LCD) with a single gap type and capable of balancing a color difference between the reflective and transmissive regions.

2. Description of the Related Art

Due to the characteristics of thin profile and low power consumption, liquid crystal displays (LCDs) have been widely used in electronic products, such as portable personal computers, digital cameras, projectors, etc.

Unlike CRTs (cathode ray tubes) and EL (electroluminescent) devices, LCDs do not emit light themselves, hence, transmissive LCDs require a backlight module. The backlight usually consumes 50% or more of the total power consumed by the LCD device. Therefore, power consumption is increased due to the use of backlight.

For solving the aforementioned problem, a reflective type LCD is thus developed for people who rely primarily on an LCD device or use the LCD device outdoors. A reflective type LCD comprises a reflector, instead of a backlight, to reflect ambient light. Reflective LCD devices, generally, include TN (twisted nematic) mode devices and STN (super twisted nematic) mode devices.

The reflective type LCD has the drawback of low visibility when ambient light decreases. In contrast, the drawback of the transmissive type LCD is that the visibility is very low when the ambient light is very bright. Since the display is darker than the ambient light, the quality of color reproduction suffers. In order to improve the image quality of the display in a brightly lit environment, it is necessary to enhance the light intensity of the backlight. However, enhancing the light intensity of the backlight increases power consumption. Moreover, when the LCD is exposed to sunlight or another light source, the image quality of the display decreases considerably. For example, when the sunlight or another light source is directly incident to the LCD monitor, it is difficult to view the displayed image due to reflection.

In order to solve the above problems, both the transmissive type display and the reflective type display are constructed as a single LCD, which is a so-called transflective type LCD. FIG. 1 is a top view of an active array substrate of a transmissive type LCD, disclosed in U.S. Pat. No. 6,295,109 and issued to Sharp Corp. FIG. 2 is a cross section cut along the line II–II' of the transmissive type LCD in FIG. 1.

As shown in FIGS. 1 and 2, gate lines 53 and source lines 59a are perpendicular to each other and arranged on a transparent substrate. Thin film transistors (TFTs) 57 are respectively disposed in the vicinity of the intersection of each gate line 53 and each source line 59a. The drain electrode 59c of the TFT 57 is connected to a transmissive electrode 58a, used as a portion of a pixel electrode, for providing voltage to the liquid crystal material in the transmissive region T. In the reflective region R, an interlayer insulating layer 60 and a reflective electrode 61 are disposed on the transmissive electrode 58a. The reflective electrode 61 is connected to the drain electrode 59c via a contact hole 63, and used as a portion of the pixel electrode. Therefore, when viewing the above described LCD, the transmissive region T possesses a considerably high light transmission ratio, while the reflective region R possesses a considerably high light reflection ratio.

As shown, the TFT 57 comprises a gate insulating layer 54, a semiconductor layer 55, semiconductor contact layers 56a and 56b, a source electrode 59b, a drain electrode 59c and a gate electrode 52. The gate electrode 52 is branched from the gate line 53.

The light in the transmissive region T will pass through the liquid crystal layer with a thickness of dt once, while the light in the reflective region R will pass through the liquid crystal layer with a thickness of dr twice. In order to match retardation caused by the liquid crystal layer in the reflective region R and retardation caused by the liquid crystal layer in the transmissive region T, a thickness relationship of dt=2×dr must be satisfied. The thickness dr of the liquid crystal layer in the reflective region R and the thickness dt of the liquid crystal layer in the transmissive region T can be adjusted by varying the thickness of the interlayer insulating layer 60.

The aforementioned transmissive type LCD has two gaps, i.e., dt and dr. Although the color difference between the reflective region R and the transmissive region T is almost the same, a height difference between the reflective region R and the transmissive region T hinders formation of an alignment film by rubbing during the manufacturing process.

SUMMARY OF THE INVENTION

According to the foregoing description, an object of this invention is to provide a transflective liquid crystal display (LCD) with a single gap. By accurately controlling relative positions of each optical element in the LCD, color difference between a reflective region and a transmissive region, caused by the transflective LCD with a single gap, can be prevented.

According to the object(s) mentioned above, the present invention provides a transflective liquid crystal device capable of balancing a color difference between a reflective region and a transmissive region. The arrangement conditions of optical elements in the transflective LCD are described in the following.

The twist angle of the liquid crystal is between about 40° and about 80°, and the retardation $(\Delta n \times d)_{LC}$ (i.e., the phase difference) of the liquid crystal is between about 200 and 300 nm.

The optical axes of the first alignment film, the first quarter wavelength ($\lambda/4$) plate, the first half-wavelength ($\lambda/2$) plate, and the first polarization plate, which are arranged downwards above the liquid crystal layer near the viewing side, have the following relationships. An angle ($\beta_{up}$) between a rubbing direction of the first alignment film and a transmissive axis of the first polarization plate is −20° to −60°. An angle ($\theta_{up}$) between the transmissive axis of the first polarization plate and a retardation axis of the first half-wavelength ($\lambda/2$) plate is 60° to 110°. An angle between the retardation axis of the first half-wavelength ($\lambda/2$) plate and a retardation axis of the first quarter wavelength ($\lambda/4$) plate is 30° to 100°.

The optical axes of the second alignment film, the second quarter wavelength ($\lambda/4$) plate, the second half-wavelength ($\lambda/2$) plate, and the second polarization plate, which are arranged downwards under the liquid crystal layer near the backlight side, have the following relationships. An angle ($\beta_{down}$) between a rubbing direction of the second alignment film and a transmissive axis of the second polarization plate is −20° to 20°. An angle ($\theta_{down}$) between the transmissive axis of the second polarization plate and a retardation axis of the second half-wavelength (λ/2) plate is −30° to 20°. An angle between the retardation axis of the second half-wavelength (λ/2) plate and a retardation axis of the second quarter wavelength (λ/4) plate is 30° to 80°.

The retardation (i.e., the phase difference) conditions of the first half-wavelength (λ/2) plate and the first quarter wavelength (λ/4) plate near the viewing side are as follows. The retardation of the first and the second half-wavelength (λ/2) plates is between about 220 nm and about 280 nm. The retardation of the first and the second quarter wavelength (λ/4) plates is between about 110 nm and about 150 nm.

In the above transflective LCD, a reflective electrode and a transparent electrode can be further arranged on the same plane between the second alignment film and the second quarter wavelength (λ/4) plate.

BRIEF DESCRIPTION OF THE DRAWINGS

The preferred embodiment of the invention is hereinafter described with reference to the accompanying drawings in which.

DETAILED DESCRIPTION OF THE INVENTION

Figure 1:
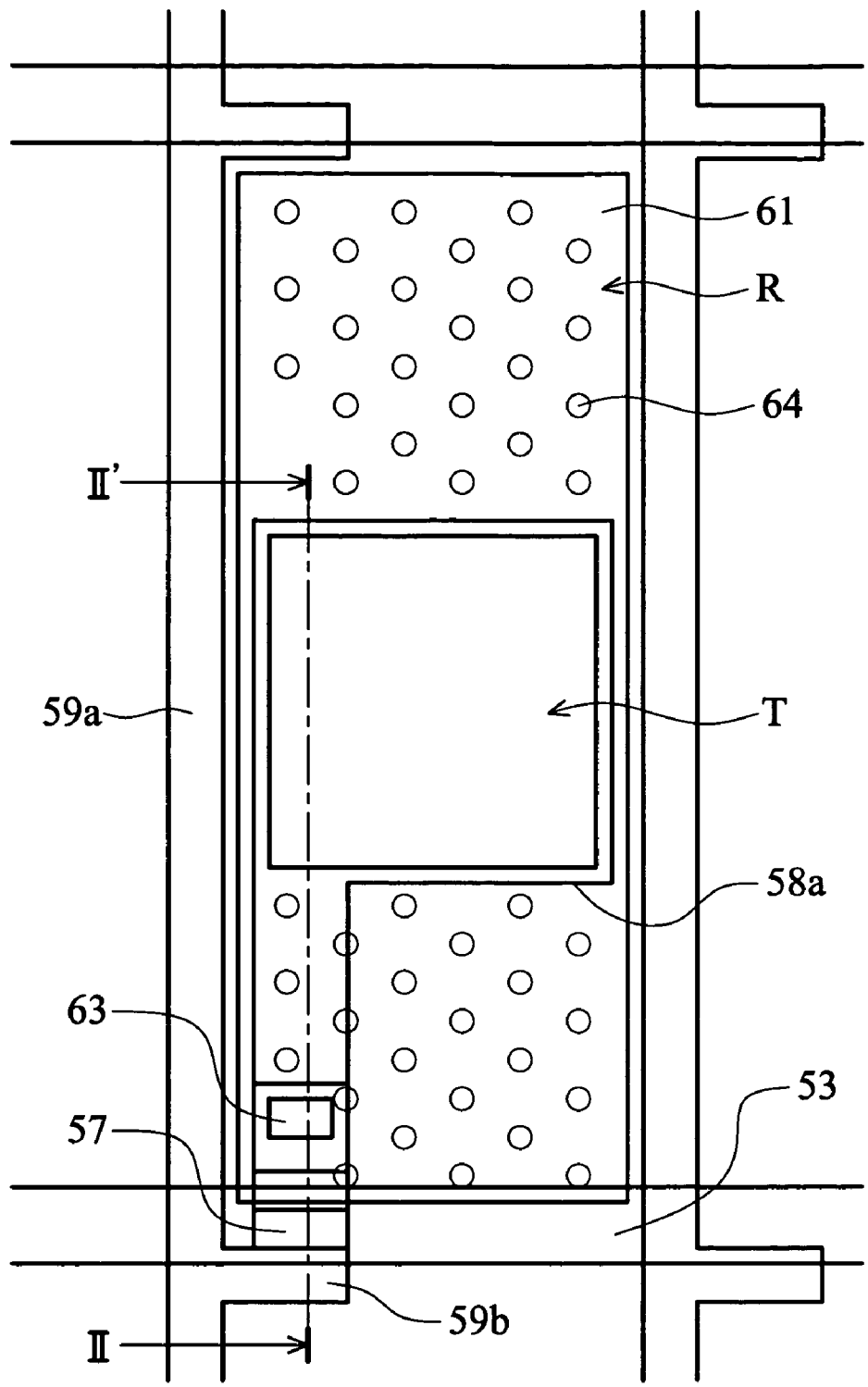
FIG. 1 is a top view of a conventional active array substrate of a transmissive type LCD.
Figure 2:
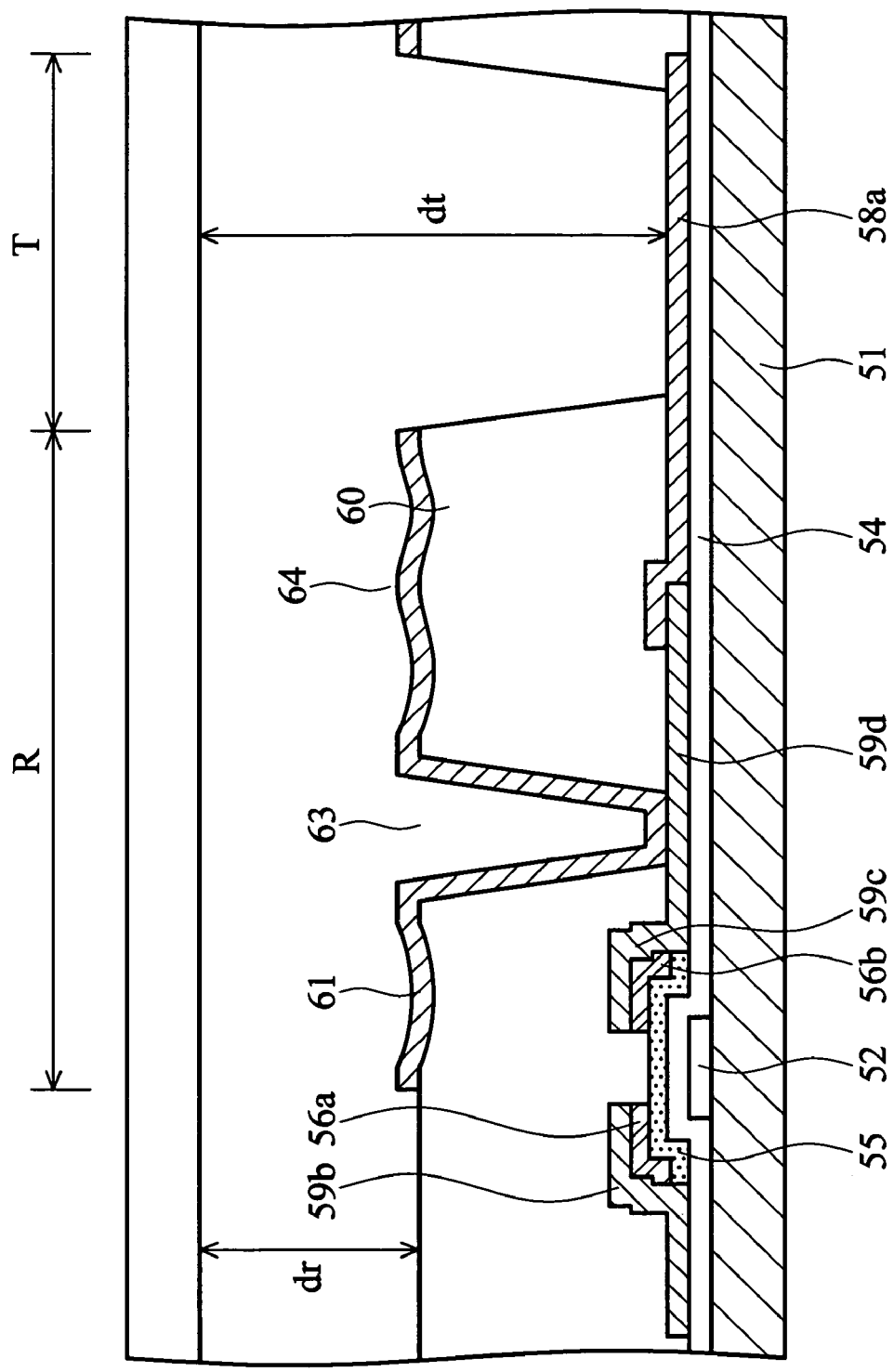
FIG. 2 is a cross section cut along the line II–II' of the transmissive type LCD in FIG. 1.
Figure 3A:
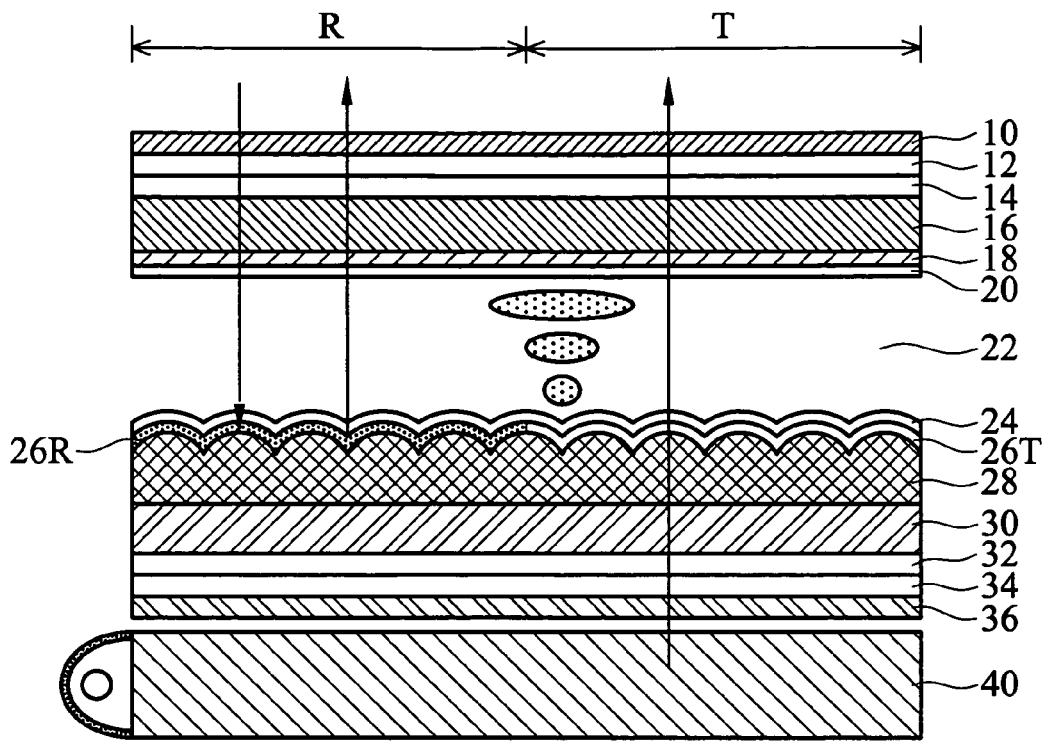
FIG. 3A shows a transmissive mode and a reflective mode of a transflective type LCD with a single gap without applying voltage to the liquid crystal layer according to one embodiment of the present invention.
Figure 3B:
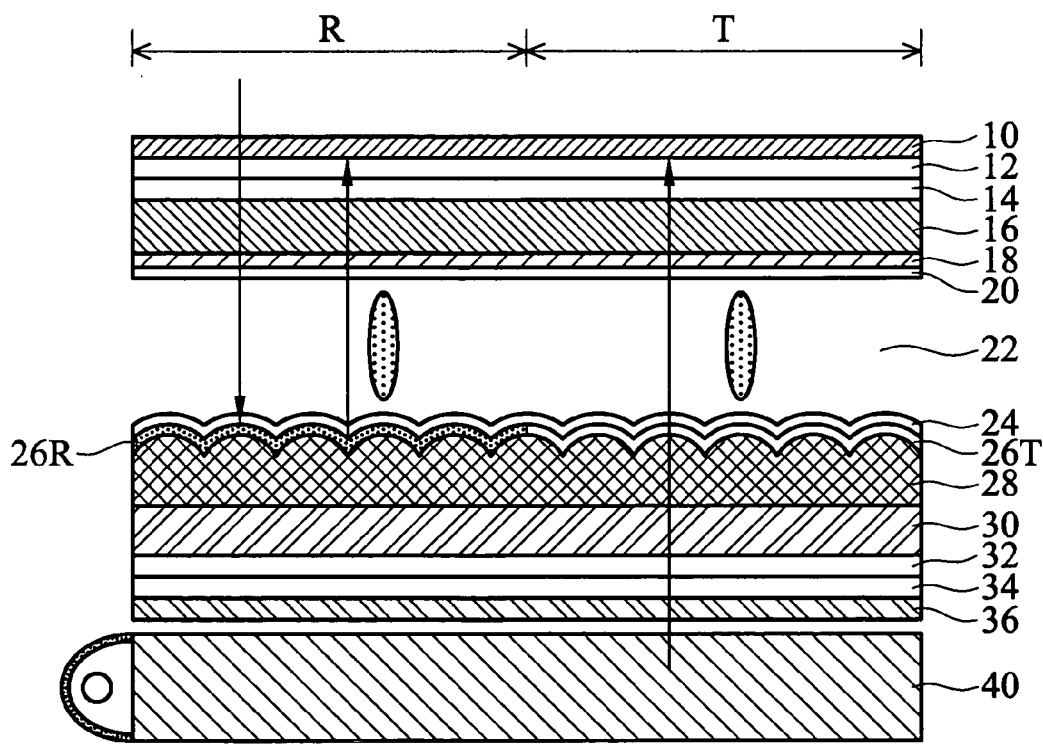
FIG. 3B shows a transmissive mode and a reflective mode of a transflective type LCD with a single gap with applying voltage to the liquid crystal layer according to one embodiment of the present invention.

FIGS. 3A and 3B are cross sections of a transflective LCD with a single gap. In FIGS. 3A and 3B, only one pixel area is depicted, and each pixel area includes a transmissive region T and a reflective region R.

At the viewing side of the transflective LCD, a half-wavelength (λ/2) plate 12 and a quarter wavelength (λ/4) plate 14 are included between an upper substrate 16 and an upper polarization plate 20. Additionally, opposite the viewing side of the transflective LCD, a half-wavelength (λ/2) plate 34 and a quarter wavelength (λ/4) plate 32 are also included between a lower substrate 30 and a lower polarization plate 36.

A reflective electrode 26R with a high reflection coefficient, whose material can be aluminum (Al), or tantalum (Ta), is arranged in a reflective region R on the lower substrate 30. A transmissive electrode 26T with a high transmission coefficient, whose material can be indium tin oxide (ITO), is arranged in a transmissive region T on the lower substrate 30. The reflective electrode 26R and the transmissive electrode 26T form a pixel electrode. According to the present invention, the reflective electrode 26R and the transmissive electrode 26T are arranged on the same plane and provide the advantage of forming an alignment film 24.

An interlayer insulating layer 28, for covering a thin film transistor (TFT, not shown), a gate line (not shown) and a source (not shown), etc., are further included between the lower substrate 30 and the pixel electrode including the reflective electrode 26R and the transmissive electrode 26T. In addition, a transparent counter electrode 18 is arranged on the surface of the upper substrate 16. A liquid electrode layer 22 is disposed between the counter electrode 18 and the pixel electrode including the reflective electrode 26R and the transmissive electrode 26T.

Furthermore, alignment films 24 and 20 are respectively arranged on the pixel electrode (the reflective electrode 26R and the transmissive electrode 26T) and the counter electrode 18 for aligning liquid crystal molecules in the liquid crystal layer 22.

A backlight 40 is arranged on the surface of the polarization plate 36 away from the lower substrate 30.

For balancing a color difference between the reflective region R and the transmissive region T of the transflective LCD with a single gap, the aforementioned optical elements have to satisfy following conditions according to the present inventors' elaborate research.

A twist angle of the above liquid crystal layer 22 is about 40° to about 80°, and a retardation $(\Delta n \times d)_{LC}$ (i.e., a phase difference) of the liquid crystal layer 22 is about 0.2 to 0.3 μm. The twist angle can be controlled by the rubbing directions of the upper alignment film 20 and the lower alignment film 24.

An angle $\beta_{up}$ between a rubbing direction of the upper alignment film 20 and a transmission axis of the upper polarization plate 10 near the upper substrate 16 is set between −20° and −60°.

An angle $\beta_{down}$ between a rubbing direction of the lower alignment film 24 and a transmission axis of the lower polarization plate 36 near the upper substrate 16 is set between −20° and 20°.

An angle $\theta_{up}$ between a transmission axis of the upper polarization plate 10 and a retardation axis of the upper half-wavelength (λ/2) plate 12 is set between −60° and 110°.

An angle $\theta_{down}$ between a transmission axis of the lower polarization plate 36 and a retardation axis of the lower half-wavelength (λ/2) plate 34 is set between −30° and 20°.

An angle between a retardation axis of the upper half-wavelength (λ/2) plate 12 and a retardation axis of the upper quarter wavelength (λ/4) plate 14 is set between 30° and 100°.

An angle between a retardation axis of the lower half-wavelength (λ/2) plate 34 and a retardation axis of the lower quarter wavelength (λ/4) plate 32 is set between 30° and 80°.

According to the above constraints for the optical elements, a transflective LCD with a single gap can be made for balancing the color difference between the reflective region R and the transmissive region T. In addition, conditions of following parameters for the aforementioned optical elements can be further controlled.

The retardation of the upper λ/2 plate 12 is 220 nm to 280 nm.

The retardation of the lower λ/2 plate 34 is 220 nm to 280 nm.

The retardation of the upper λ/4 plate 14 is 110 nm to 150 nm.

The retardation of the lower λ/4 plate 32 is 110 nm to 150 nm.

The manner of display in the single gap transflective LCD will be described in conjunction with FIGS. 3A and 3B.

FIG. 3A shows a transmissive mode and a reflective mode of a transmissive type LCD with single gap without applying voltages to the liquid crystal layer 22 according to the present invention. At the reflective region R, the ambient light is incident and passes through the polarization plate 10, the λ/2 plate 12, the λ/4 plate 14 and the liquid crystal layer 22 sequentially. After being reflected by the reflective electrode 26R, the reflected light passes through the liquid crystal layer 22, the λ/4 plate 14, the λ/2 plate 12, and the polarization plate 10 sequentially. At the transmissive region T, the light from the backlight 40 passes through the polarization plate 36, the λ/2 plate 34, the λ/4 plate 32, the liquid crystal layer 22, the λ/4 plate 14, the λ/2 plate 12, and the polarization plate 10 sequentially. Therefore, the pixel becomes bright.

FIG. 3B shows a transmissive mode and a reflective mode of a transmissive type LCD with a single gap with voltage applied to the liquid crystal layer 22 according to the present invention. At the reflective region R, the ambient light is incident and passes through the polarization plate 10, the λ/2 plate 12, the λ/4 plate 14 and the liquid crystal layer 22 sequentially. After reflected by the reflective electrode 26R, the reflected light passes through the liquid crystal layer 22, the λ/4 plate 14 and the λ/2 plate 12 sequentially, and then becomes a linearly polarized light. However, in this situation, since the linear polarization angle of the linearly polarized light is not parallel with the transmissive axis of the polarization plate 10, the linearly polarized light will be absorbed by the polarization plate 10. At the transmissive region T, the light from the backlight 40 passes through the polarization plate 36, the λ/2 plate 34, the λ/4 plate 32, the liquid crystal layer 22, the λ/4 plate 14 and the λ/2 plate 12 sequentially, and then becomes a linearly polarized light. However, in this situation, since the linear polarization angle of the linearly polarized light is not parallel with the transmissive axis of the polarization plate 10, the linearly polarized light will be absorbed by the polarization plate 10. Therefore, the pixel becomes dark.

EXAMPLE 1

Figure 4:
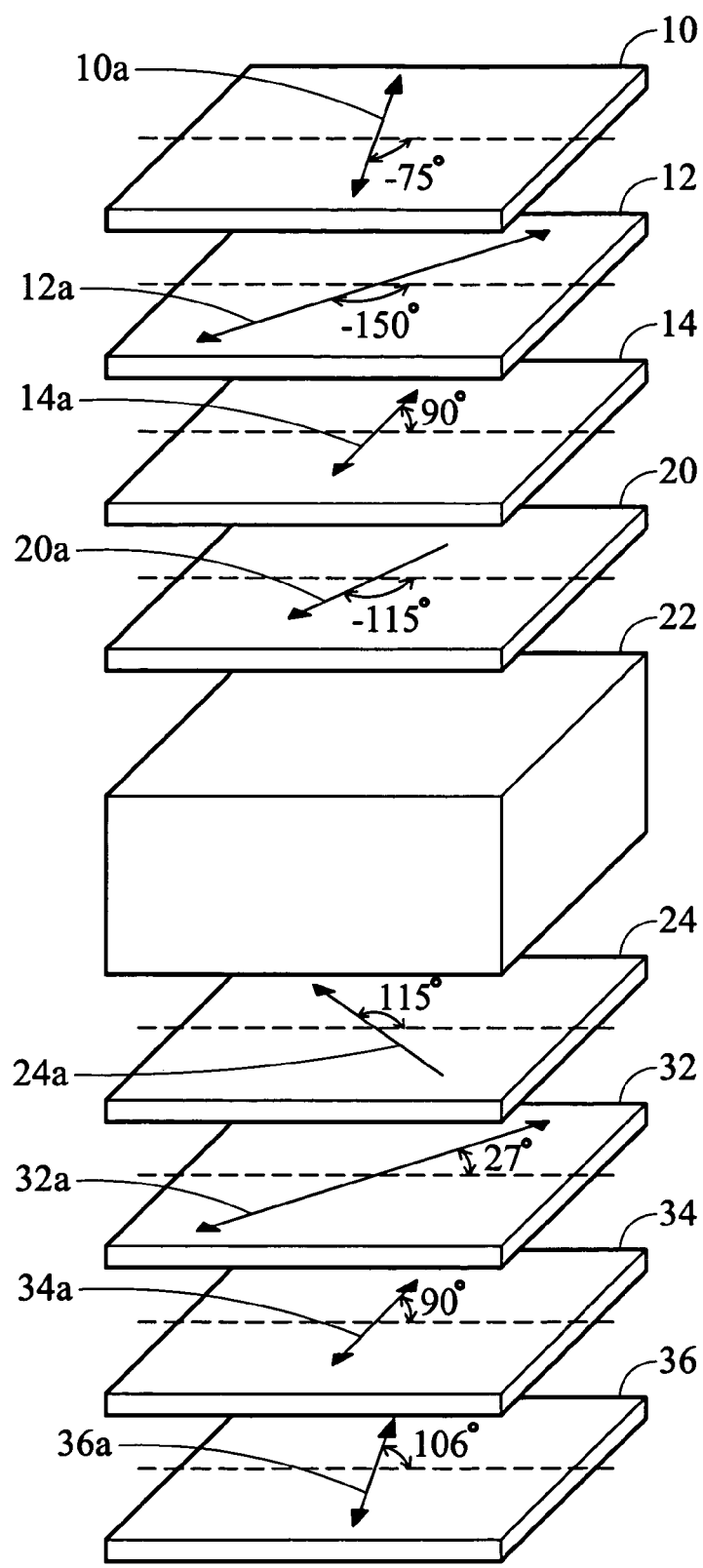
FIG. 4 schematically shows relative positions of optical elements of the LCD in Example 1.

Example 1 is described in detail according to FIG. 4. In Example 1, the twist angle of the liquid crystal layer 22 is 50°, the thickness d of the liquid crystal layer 22 is 35 μm, Δn of the liquid crystal molecules of the liquid crystal layer 22 is $n_e-n_o=0.064$, wherein $n_e$ is the refraction index of the liquid crystal molecules with respect to the extraordinary light and $n_o$ is the refraction index of the liquid crystal molecules with respect to the ordinary light. The retardation $(\Delta n \times d)_{LC}$ of the liquid crystal cell is 0.064×0.35 μm=224 nm.

The rubbing direction 20a of the alignment film 20 above the liquid crystal layer 22 and a horizontal reference line H forms an angle of −115°, and the rubbing direction 20a is from the upside down to the left side. The rubbing direction 24a of the alignment film 24 under the liquid crystal layer 22 and the horizontal reference line H forms an angle of 115°, and the rubbing direction 24a is from the downside up to the left side.

The angle between the horizontal reference line H and the retardation axis 14a of the λ/4 plate 14 above the liquid crystal layer 22 is 90°, and the angle between the horizontal reference line H and the retardation axis 32a of the λ/4 plate 32 under the liquid crystal layer 22 is 27°.

In addition, the retardation of the upper λ/4 plate 14 is 120 nm, and the retardation of the lower λ/4 plate 32 is 140 nm.

The angle between the horizontal reference line H and the retardation axis 12a of the upper λ/2 plate 12 is 30°, and the angle between the horizontal reference line H and the retardation axis 34a of the lower λ/2 plate 34 is 90°.

Therefore, the angle $\theta_{up}$ (i.e., the angle between the transmissive axis 10a and the retardation axis 12a) is 75°. The angle $\theta_{down}$ (i.e., the angle between the transmissive axis 36a and the retardation 34a) is 75°.

The retardation of the upper λ/2 plate 12 is 265 nm, and the retardation of the lower λ/2 plate 34 is 270 nm.

The angle between the horizontal reference line H and the transmissive axis 10a of the upper polarization plate 10 is 105°, and the angle between the horizontal reference line H and the transmissive axis 36a of the lower polarization plate 36 is 106°.

Therefore, the angle $\beta_{up}$ (i.e., the angle between the rubbing direction 20a and the transmission axis 10a) is −40°. The angle $\beta_{down}$ (i.e., the angle between the rubbing direction 24a and the transmission axis 36a) is 9°.

The LCD constructed under above conditions of the aforementioned optical elements has a reflection rate of 41% and a reflective contrast ratio of 34.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A transflective liquid crystal display device capable of balancing color difference between a reflective region and a transmissive region, comprising:
    a first substrate;
    a second substrate;
    a liquid crystal layer disposed between the first and the second substrates;
    a first polarization plate arranged on the first substrate and opposite to the liquid crystal layer;
    a second polarization plate ranged on the second substrate and opposite to the liquid crystal layer;
    a first half-wavelength, (λ/2) plate arranged between the first polarization plate and the liquid crystal layer;
    a first quarter wavelength (λ/4) plate arranged between the first half-wavelength plate and the liquid crystal layer;
    a first alignment film arranged between the first quarter wavelength plate and the liquid crystal layer;
    a second half-wavelength (λ/2) plate arranged between the second polarization plate and the liquid crystal layer;
    a second quaffer wavelength (λ/4) plate arranged between the second half-wavelength plate and the liquid crystal layer;
    a second alignment film arranged between the second quarter wavelength plate and the liquid crystal layer;
    a reflective electrode and a transparent electrode arranged in-plane between the second alignment film and the second substrate; and
    a backlight arranged on a surface of the second polarization plate and opposite to the second substrate,
    wherein a twist angle of the liquid crystal is 40° to 80°, a retardation $(\Delta n \times d)_{LC}$ of the liquid crystal is 200 to 300 nm, an angle ($\beta_{up}$) between a rubbing direction of the first alignment film and a transmissive axis of the first polarization plate is −20° to −60°, an angle ($\beta_{down}$) between a rubbing direction of the second alignment film and a transmissive axis of the second polarization plate is −20° to 20°, an angle ($\theta_{up}$) between the transmissive axis of the first polarization plate and a retardation axis of the first half-wavelength (λ/2) plate is 60° to 110°, an angle ($\theta_{down}$) between the transmissive axis of the second polarization plate and a retardation axis of the second half-wavelength (λ/2) plate is −30° to 20°, an angle between the retardation axis of the first half-wavelength (λ/2) plate and a retardation axis of the first quarter wavelength (λ/4) plate is 30° to 100°, and an angle between the retardation axis of the second half-wavelength (λ/2) plate and a retardation axis of the second quarter wavelength (λ/4) plate is 30° to 80°.

2. The transflective liquid crystal display device of claim 1, wherein a retardation of the first and the second half-wavelength (λ/2) plates is 220 nm to 280 nm.

3. The transflective liquid crystal display device of claim 1, wherein a retardation of the first and the second quarter wavelength (λ/4) plates is 110 nm to 150 nm.

* * * * *